INVENTORS
ERHARD J. SCHIMITSCHEK
RICHARD B. NEHRICH, JR.
BY EDWARD R. SCHUMACHER

ATTORNEYS

3,541,469
ADJUSTABLE RECIRCULATING LIQUID LENS LASER CELL

Erhard J. Schimitschek, Richard B. Nehrich, Jr., and Edward R. Schumacher, San Diego, Calif., assignors to the United States of America as represented by the Secretary of the Navy
Filed July 25, 1967, Ser. No. 656,628
Int. Cl. H01s 3/00
U.S. Cl. 331—94.5      1 Claim

ABSTRACT OF THE DISCLOSURE

The present cell is formed of a tublar casing containing an elongate tubular insert and partitioning means mounted on the insert and extending radially into contact with the casing to provide a liquid lens chamber. The tubular insert, which is adapted to contain the liquid lasing solution, such as a rare earth chelate solution, projects outwardly through each of the partitioning means into a closed reservoir also containing the liquid lasing solution. The liquid lens chamber contains a liquid lens material which can be varied to suit operating conditions. A confocal mirror arrangement reflects the light produced when the lasing solution is exposed to an energy source and the entire arrangement including the cell, mirrors and source are mounted in a suitable housing. A feature of the cell is that both the liquid lasing solution and the liquid lens material are recirculated through a heat exchanger to maintain the temperature of both materials constant and equal. The circuits for the recirculation of both liquid materials preferably include a small centrifugal pump to provide a relatively constant flow rate, filter means and thermocouples to register and permit control of the temperature of the liquids.

---

Figure 1:
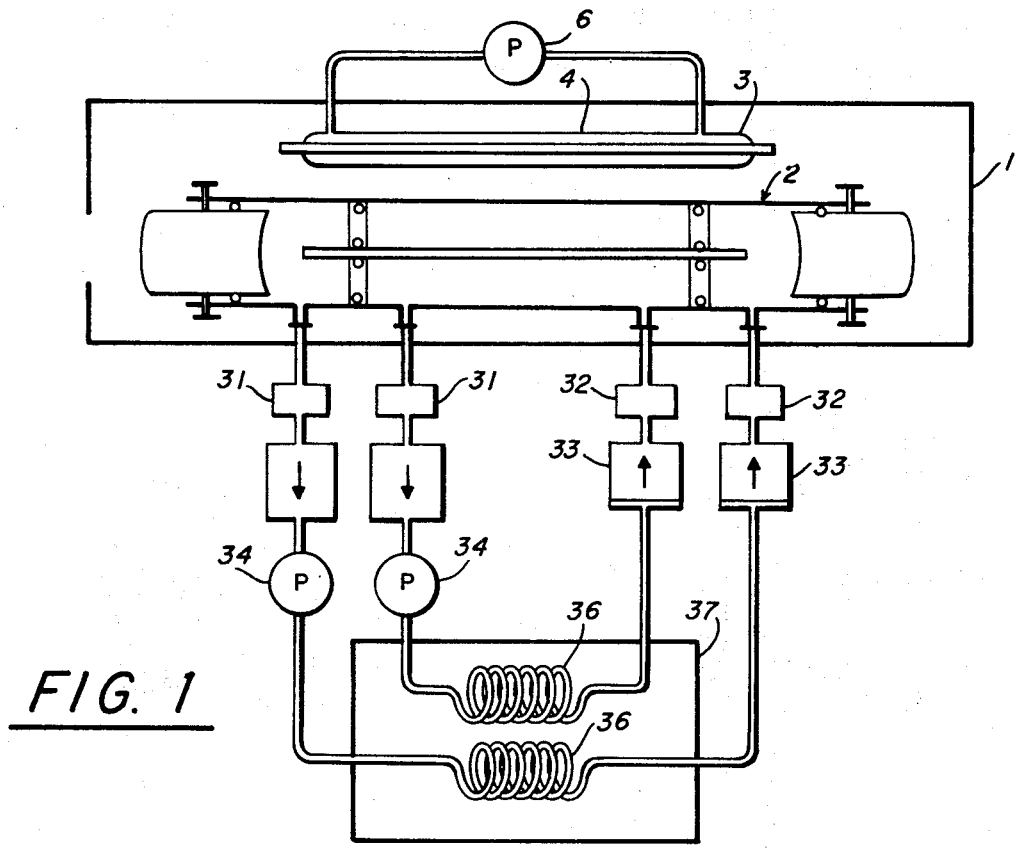

The invention described herein may be manufactured and used by or for the Government of the United States of America for governmental purposes without the payment of any royalties thereon or therefor.

As indicated, the present invention relates to liquid laser cells and, in particular, to cells utilizing lasing solutions capable of being recirculated through a heat exchanger.

A copending patent application "Recirculating Liquid Laser Cell," Ser. No. 429,181, filed Jan. 29, 1965, and now abandoned describes a liquid laser cell in which the lasing solution, which is a particular chelate, is recirculated during lasing operation through a heat exchanger circuit capable of maintaining the temperature of the solution at a level most appropriate for stimulated emission. Such recirculation is advantageous since it permits substantially continuous stimulated emission, i.e. laser action. If recirculation is not performed, each firing event results in such an increase in the temperature of the solution that another event cannot occur until the temperature returns to a point within the lasing range of the solution. Heat, of course, is produced by the use of a conventional lasing energy source, such as a Xenon flash lamp.

It is not possible to achieve recirculation and temperature maintenance with all types of liquid lasing solutions, particularly with the better known solutions formed by dissolving particular rare earth chelates in conventional alcoholic solvent systems. Such solutions usually have a lasing temperature of about −150° C. at which the solution is extremely viscous with very low flowability and a consequent incapacity for recirculation.

The referenced copending patent application describes and defines a particular lasing solution capable of recirculation, this solution, which is formed of the chelate, europium benzoyl trifluoroacetonate, dissolved in acetonitrile, being described in greater detail in copending application "Laser Action in Fuorinated Europium Chelates Dissolved in Acetonitrile," Ser. No. 418,358, filed Dec. 14, 1964, and now U.S. Pat. 3,360,478. Other solutions which permit recirculation are disclosed in another copending patent application "Substituted Europium Chelates for Liquid Laser Operation," Ser. No. 591,376, filed October 31, 1966, and now U.S. Pat. 3,450,641. It is to be understood that the cell of the present invention is intended to be used with such so-called "room temperature" lasing solutions. However other similar solutions are anticipated and it is not the present intention to limit the use of the cell to these particular solutions.

Although he advantages of recirculation are obvious, certain difficulties have been experienced in maintaining the solutions at a constant temperature and one reason for this difficulty is due to the structure of the cells themselves. Thus, the cells customarily employed for this purpose are formed of relatively thick-walled quartz or pyrex tubes provided with an axial, capillary bore which contains the liquid lasing solution. The end portions of this bore are enlarged to provide reservoirs and recirculation is accomplished by pumping the lasing solution from a reservoir at one end of tube into the reservoir at the other end to produce the desired flow. However, the thick walls of the quartz tube also become heated and, of course, impart their heat to the solution contained in the capillary to the extent that, after the tube becomes sufficiently heated, the lasing operation usually must be shut down to permit recooling of the cell itself. Such a difficulty perhaps can be controlled in the heat exchange circuit which usually contains thermocouples providing an indication of the degree to which the temperature of the recirculating solution must be reduced. However such control is difficult so that other means which will be described become desirable to assure maximum temperature control and consequently prolonged stimulated emission.

It is therefore a primary object of the present invention to provide a recirculating type liquid laser cell in which the temperature of the lasing solution can be maintained with greater precision than that achieved by the use of previous recirculating laser cells.

A further object, which will be clarified subsequently, is to improve temperature control by avoiding the use of relatively, thick-walled quartz tube laser cells. The thick quartz walls of previous tubes provide what may be termed as a lens for the flash lamp and one of the principal features permitting accomplishment of the present purposes resides in substituting a liquid lens material for this previously-used quartz lens. When such a liquid lens material is employed, it becomes possible to recirculate not only the lasing solution but the lens material itself and, when both the solution and the liquid lens materials are maintained at a constant and equal temperature, the lasing action of the cell is substantially improved.

Figure 2:
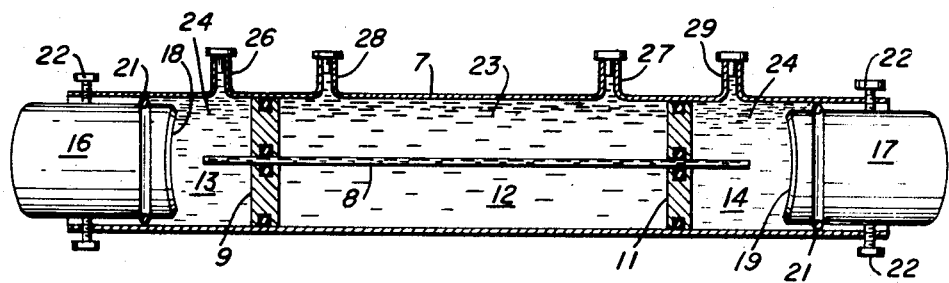

The present invention is illustrated in the accompanying drawings of which:

FIG. 1 schematically illustrates the present laser cell mounted in a suitable housing which also contains other components needed to produce the desired stimulated emission; and FIG. 2 is an enlarged schematic view of one embodiment of the laser cell itself.

Referring to FIG. 1, the operative components of the present invention are mounted in a conventional manner in a housing 1 which is a light-tight unit provided in one of its end portions with a window through which the collimated beam generated in the lasing cell can pass. Generally considered, the operative components include a laser cell 2 containing a liquid lasing solution and light pumping means, the latter including a flash tube 3, such as a Xenon flash tube, encased in a water jacket 4 which also serves as a UV filter, a pump 6 recirculating the cooling liquid.

Laser cell 2, shown in greater detail in the schematic illustration of FIG. 2, is a so-called liquid lens type of cell described in a copending patent application "Liquid Lens Laser Cell" filed in the names of Messrs. Schimitschek, Schumacher and Cook and presently identified as Navy Case No. 42,976. It will be understood that the configuration of the cell used by the present lasing apparatus may assume different forms, although it is essential that the cell be of the type which has been identified as a liquid lens cell. Referring to FIG. 2, the present cell is formed of a tubular casing 7 and a tubular insert 8 preferably of capillary size extending axially through the interior of casing 7. Both of these members may be formed of any light transmissive material, most suitably quartz or pyrex, and to provide some indication of relative size, one of the cells in present use employs a casing having an internal diameter of 5 mm. and an insert tube 8 having an internal diameter of .5 mm. Tube 8 preferably is supported by disk-shaped partitioning walls 9 and 11 mounted on tube 8 near its end portions and extending radially into a liquid-tight engagement with the interior walls of the casing. O-rings, such as those shown in FIG. 2, may be employed to render the partitions liquid-tight.

The principal purpose of the partitions aside from supporting the tube is to form the interior of the casing into a so-called liquid lens chamber 12 and liquid lasing solution reservoirs 13 and 14. As also will be noted the reservoirs are closed at their end portions by mirror members 16 and 17, these members being in the form of quartz pistons having their interior end portions formed as lens surfaces coated with a reflective material to provide reflective surfaces 18 and 19. Again O-rings, such as O-rings 21 provide a liquid-tight reservoir. To permit the reflective surfaces to be positioned in a confocal arrangement necessary for mutual reflection each piston member 16 and 17 is adjustably supported by set screws 22. Also, the piston members can be reciprocated longitudinally to vary the length of the liquid link between their reflective surfaces. Although surfaces 18 and 19 initially must reflect light, it also will be understood that one of the surfaces should be semi-reflective to the extent that it is capable of passing or transmitting the collimated laser beam.

A liquid lens material 23 fills chamber 12 and, although various fluids may be selected for the purpose, distilled water is satisfactory. The use of other fluids as a liquid lens material will be dependent upon the index of refraction desired for the cell as well as any desired to utilize the liquid lens as a light filter.

Reservoirs 13 and 14 are filled with a liquid lasing solution 24 and, since insert tube 9 is open-ended and extends into the reservoirs, the tube also contains this solution.

One of the significant features of the present invention is the fact that both liquid lasing solution 24 and liquid lens material 23 are recirculated through circuits to be described to regulate the temperature of the liquid lasing solution. Consequently, it is important for present purposes to utilize a liquid lasing solution which has sufficient fluidity to permit the recirculation. As previously indicated, many of the conventional liquid lasing solutions are quite viscous and therefore inappropriate for recirculatory purposes. Presently-contemplated solutions may be characterized by their ability to lase at "room-temperature" or at a temperature ranging from about −40° C. to +30° C. Solutions at this temperature have sufficient fluidity for recirculation and are described in the copending patent applications previously noted.

One principal feature of the invention is the fact that recirculation is applied not only to the liquid laser solution but also to the liquid lens material. To permit such a recirculation, each reservoir 13 and 14 is provided with conduits 26 and 27 and chamber 12 also is provided with a pair of short inlet and outlet conduits 28 and 29. The recirculating circuits (FIG. 1) are coupled to these conduits and each of the circuits, which are identical, include thermocouples 31 and 32 the filter 33, a pump 34 and a helical glass coil 36. Pumps 34, which may be small centrifugal pumps, are employed to keep the variations in the flow rate quite small. In operation, they may be operated between two thousand and three thousand r.p.m. The filter, which may be 5 microns in size, are placed in the flow lines to retain scattering particles.

Temperature control is achieved by use of a heat exchanger 37 through which, for practical purposes, both coils 36 extend so as to be immersed in the controlled temperature bath provided by the exchanger. The practical advantage of extending both coils through a single heat exchanger arises because of the desire not only to maintain the different liquids at the most appropriate operating temperature but also to assure that the temperature of both the liquid lasing solution and the liquid lens material are the same.

In operation, with the various components mounted in housing 1 in the manner shown in FIG. 1, flash tube 3 is energized to pump or drive the liquid lasing solution contained in capillary tube 8. Initially, energy transfers between the molecules of the lasing solution emit light waves which are reflected to and fro by mirror surfaces 18 and 19. Eventually, the intensity of the reaction produces a collimated laser beam emitted from the cell through the semireflective mirror surface.

Obviously, the temperature of the liquid lasing solution increases with each firing event, and, if recirculation and cooling is not accomplished, the solution soon reaches a temperature at which stimulated emission cannot be achieved. Although it is recognized that other prior disclosures, such as those of the above-referenced copending patent applications, contemplate recirculation of the liquid lasing solution, they do not permit the maximum temperature control which can be achieved by also recirculating a liquid lens material. Consequently, the particular advantages presently achieved are due to the significantly increased ability to maintain the lasing solution temperature at a level best suited for the lasing operation, and, as will be appreciated such increased control is due to the recirculation of the liquid lens material which, of course, is achievable only when the cell is of the liquid lens type.

Obviously many modifications and variations of the present invention are possible in the light of the above teachings. It is therefore to be understood that within the scope of the appended claims the invention may be practiced other than as specifically described.

What is claimed is:

1. Lasing apparatus for producing a substantially continuous stimulated light beam comprising:
   a thin-walled tubular casing formed of a light-transmissive material,
   a thin-walled open-ended capillary tubular insert also formed of a light-transmissive material and mounted within said tubular casing,
   a liquid lasing material filling said insert,
   a light source for energizing said liquid lasing material,
   a pair of mirror means disposed one near each end of said capillary tubular insert for reflecting light waves produced by said energization and for permitting emission of said stimulated light beam,
   partitioning means mounted on each end portion of said capillary tubular insert for forming a liquid lens chamber within said casing between said insert and said light source,
   a liquid lens material filling said chamber,
   means forming a liquid lasing material reservoir at each end of said capillary tubular insert, said insert having it open-end capillary portions projecting into fluid communication with said reservoirs, temperature regulating means for maintaining said liquid lens material and said liquid lasing material both at a substantially constant and equal temperature during said light source energization, said regulating means including:

a fluid circuit communicating with said reservoirs for recirculating said liquid laser material through a heat exchanger and completing a continuous liquid path through said capillary tubular insert, second fluid circuit communicating with said chamber for recirculating said liquid lens material through said heat exchanger separately from said recirculating liquid laser material, and pump means for producing the recirculatory flow of said liquids, said heat exchanger being of sufficient capacity for counteracting temperature changes produced by said light source energization whereby the temperature of both said liquid laser material and said liquid lens material are maintained at substantially a constant level suitable for substantially continuous production of said stimulated light beam emission.

References Cited

UNITED STATES PATENTS

| | | | |
|---|---|---|---|
| 3,225,307 | 12/1965 | Weissman | 331—94.5 |
| 3,242,439 | 3/1966 | Rigden et al. | 331—94.5 |
| 3,356,966 | 12/1967 | Miller | 331—94.5 |
| 3,417,344 | 12/1968 | Grantham | 331—94.5 |

RONALD L. WIBERT, Primary Examiner

C. CLARK, Assistant Examiner